United States Patent
Sato

(10) Patent No.: US 9,003,923 B2
(45) Date of Patent: Apr. 14, 2015

(54) COVER STRUCTURE OF MACHINE TOOL

(71) Applicant: Fanuc Corporation, Yamanashi (JP)

(72) Inventor: Naoki Sato, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 13/681,778

(22) Filed: Nov. 20, 2012

(65) Prior Publication Data

US 2013/0199333 A1 Aug. 8, 2013

(30) Foreign Application Priority Data

Feb. 2, 2012 (JP) .................................. 2012-021239

(51) Int. Cl.
*F16P 1/00* (2006.01)
*F16P 3/02* (2006.01)

(52) U.S. Cl.
CPC ...... *F16P 1/00* (2013.01); *F16P 3/02* (2013.01)

(58) Field of Classification Search
USPC ......... 74/608, 612, 613; 52/67; 160/201, 202, 160/222, 223; 409/134
See application file for complete search history.

(56) References Cited

U.S. PATENT DOCUMENTS

| | | | | |
|---|---|---|---|---|
| 3,988,980 | A | * | 11/1976 | Walker ........................... 100/349 |
| 4,039,021 | A | * | 8/1977 | Moritz et al. ................. 160/202 |
| 5,364,210 | A | * | 11/1994 | Rutschle et al. .............. 409/134 |
| 5,871,312 | A | * | 2/1999 | Haninger et al. ............. 409/134 |
| 6,131,340 | A | * | 10/2000 | Clark et al. ..................... 49/410 |
| 2011/0156884 | A1 | * | 6/2011 | Tsuchimochi et al. ...... 340/12.1 |

FOREIGN PATENT DOCUMENTS

| | | |
|---|---|---|
| DE | 29509538 U1 | 8/1995 |
| JP | 5-340 U | 1/1993 |
| JP | 10-309648 A | 11/1998 |
| JP | 11-300572 A | 11/1999 |
| JP | 2008-223456 A | 9/2008 |

OTHER PUBLICATIONS

Office Action corresponding to JP2012-021239, dated Jan. 8, 2013.
Office Action dated Jan. 15, 2015, corresponding to German patent application No. 102013100927.1.

* cited by examiner

*Primary Examiner* — Vicky Johnson
(74) *Attorney, Agent, or Firm* — Lowe Hauptman & Ham, LLP

(57) ABSTRACT

A cover structure of a machine tool, including a fixed cover for isolating the inside portion of the machine tool from the outside, the inside portion serving as a machining space, and a one-side opening type slide door for opening and closing an opening portion formed in the fixed cover, includes a stop structure portion for, when the slide door is closed, stopping the slide door at a predetermined distance away from the end surface of the opening portion of the fixed cover. The stop structure portion is provided on a portion of the slide door other than the closing-direction-side end surface of the slide door, or at a portion of the fixed cover other than the slide-door-closing-side end surface of the opening portion of the fixed cover.

12 Claims, 15 Drawing Sheets

COVER STRUCTURE OF MACHINE TOOL

RELATED APPLICATIONS

The present application is claims priority from, Japanese Application Number 2012-021239, filed Feb. 2, 2012, the disclosure of which is hereby incorporated by reference herein in its entirety.

BACKGROUND OF THE INVENTION

1. Field of the Invention

The present invention relates to a cover structure of a machine tool.

2. Description of the Related Art

In order to secure the safety of an operator and to prevent chips and coolant from scattering around a machine tool, the machining space of the machine tool is covered with a cover in many cases. Also, a slide door is provided in a part of the cover to facilitate placement and retrieval of a workpiece, and other operations. Further, in many cases, electronic devices, such as a CNC (numerical controller for controlling the machine tool) and an operation panel, are provided on the cover, especially on a fixed cover located on the closing direction side of the slide door.

In some use cases, the slide door of the machine tool may be opened and closed as frequently as 1000 times or more per day, and may also be opened and closed much quickly in order to increase the production efficiency. For this reason, it is necessary to devise something to reduce a shock due to the opening and closing of the slide door so as to prevent the devices provided on the cover, such as the CNC and the operation panel, from being damaged by the shock.

To cope with this, for example, Japanese Utility Model Laid-Open No. 5-340 discloses a cover structure of a machine tool, which is provided with an opening portion of a splash guard surrounding the machining space of the machine tool, the opening portion being used for carrying in and out a workpiece, a fixed cover formed around the opening portion, first and second slide doors movably provided to open and close the opening portion and provided so as to cover the opening portion, and sliding contact members respectively attached to the first and second slide doors. The sliding contact member is always brought into sliding contact with the first slide door or the second slide door. When the first slide door is moved, the sliding contact member makes the second slide door follow the first slide door. When the second slide door reaches a movement end, the sliding contact member allows only the first slide door to be moved.

Further, a method has conventionally been adopted, in which a cushioning material, such as cushion rubber, is attached to the closing-direction end surface of the slide door, so as to reduce a shock generated at the time when the slide door collides with the fixed cover provided on the closing-direction side of the slide door. FIG. 22 is a view explaining a conventional cover structure where a slide door is provided inside the machine tool and opened. FIG. 23 is a view explaining a state where the slide door is closed in the cover structure of FIG. 22. FIG. 24 is a view explaining a cross section of the cover structure of FIG. 23.

As shown in FIG. 22, an opening portion is provided in a fixed cover 2 surrounding the inside portion of the machine-tool, which is the machining space of the machine tool, and a slide door 4 used for an operation, such as taking a workpiece into and out of the machining space, is provided in the opening portion. Electronic devices 8, such as a numerical controller (CNC) and an operation panel, are attached to the side surface of the fixed cover 2. Further, a shock absorbing member 6, such as cushion rubber or cushion sponge, is attached to the closing-direction-side end surface of the slide door 4, in order to absorb a shock due to a collision between the closing-direction-side end surface of the slide door 4 and the slide-door-closing-side end surface of the opening portion of the fixed cover 2 caused at the time when the slide door 4 is closed as shown in FIG. 23 and FIG. 24. As shown in FIG. 24, when the slide door 4 is closed, the shock caused by the collision between the slide door 4 and the side end surface of the fixed cover 2 is reduced by the shock absorbing member 6 in the portion indicated by reference numeral 110. In this case, in the portion indicated by reference numeral 110, the side end surface of the slide door 4, where the shock absorbing member 6 is attached, is first brought into contact with the side end surface of the fixed cover 2, and then, in the portion indicated by reference numeral 100, the side end surface of the slide door 4 is brought into contact with the side end surface of the fixed cover 2 or is not brought into contact with the side end surface of the fixed cover 2.

Note that FIG. 25 to FIG. 27 show an example of a cover structure of a machine tool in which a slide door 14 is provided outside the machine tool. FIG. 25 shows a state where the slide door is opened, and FIG. 26 shows a state where the slide door is closed. Further, FIG. 27 is a view explaining a cross section of the cover structure of FIG. 26. The cover structure shown in FIG. 25 to FIG. 27 is similar to the structure described above with reference to FIG. 22 to FIG. 24, and hence the description thereof is omitted.

In some use cases, the slide door of the machine tool may be opened and closed as frequently as 1000 times or more per day and may also be opened and closed much quickly in order to increase production efficiency. Therefore, in the cover structure described in Japanese Utility Model Laid-Open No. 5-340, the wear of the sliding contact member is large, and the slide door cannot be opened and closed quickly.

Further, in the cover structure of the machine tool, which is described with reference to FIG. 22 to FIG. 27, each of shock absorbing members 6 and 16, such as cushion rubber and cushion sponge, is attached to the closing-direction-side end surface of each of the slide doors 4 and 14, in order to absorb a shock due to a collision between the closing-direction-side end surface of each of the slide doors 4 and 14, and the slide-door-closing-side end surface of the opening portion of each of the fixed covers 2 and 12. In this cover structure of the machine tool, wearing and falling off of each of the shock absorbing members 6 and 16, such as cushion rubber and cushion sponge, are caused due to the shock at the time of closing the slide door, and due to the influence of chips, coolant, and the like. As a result, when the slide door is closed, the shock due to the collision between the slide door and the fixed cover is increased, and thereby electronic devices, such as a numerical controller and an operation panel, provided on the fixed cover, may be damaged.

SUMMARY OF THE INVENTION

Therefore, in view of the above described problems of the prior art, it is an object of the present invention to provide a cover structure of a machine tool, which can reduce the possibility of breakage of electronic devices provided on a fixed cover.

A cover structure of a machine tool according to the present invention includes a fixed cover for isolating an inside portion of the machine tool from the outside, the inside portion serving as a machining space, and one or more one-side opening type slide doors for opening and closing an opening portion formed in the fixed cover. Further, the cover structure of the machine tool includes a stop structure portion for, when the slide door is moved in the closing direction, stopping the slide door at a predetermined distance away from the end surface of the opening portion of the fixed cover, the stop structure portion being provided on a portion of the slide door other than the closing-direction-side end surface of the slide door, or provided on a portion of the fixed cover other than the slide-door-closing-side end surface of the opening portion of the fixed cover.

Further, the stop structure portion can be provided at a position of the end portion of the opening portion of the fixed cover, the end portion crossing the opening and closing direction of the slide door, or can be provided at a position above or below the opening portion.

The stop structure portion may include a shock absorbing member.

The shock absorbing member may be able to be attached to and detached from the outside of the cover structure.

The shock absorbing member may be made of cushion rubber or cushion sponge, or may be formed by a spring or a shock absorber. Further, the shock absorbing member may be formed by a metal plate to which one of cushion rubber, cushion sponge, a spring, and a shock absorber is fixed.

According to the present invention, it is possible to provide a cover structure of a machine tool, which can reduce the possibility of breakage of electronic devices provided on a fixed cover.

BRIEF DESCRIPTION OF THE DRAWINGS

The above and other objects and features of the present invention will be more apparent from the following description of the preferred embodiments with reference to the accompanying drawings, wherein.

DETAILED DESCRIPTION OF THE PREFERRED EMBODIMENTS

<Cover Structure of Machine Tool with Slide Door Provided Inside Machine Tool>

An embodiment of a cover structure of a machine tool according to the present invention, in which a slide door is provided inside the machine tool, is described with reference to FIG. 1 to FIG. 3.

Figure 1:
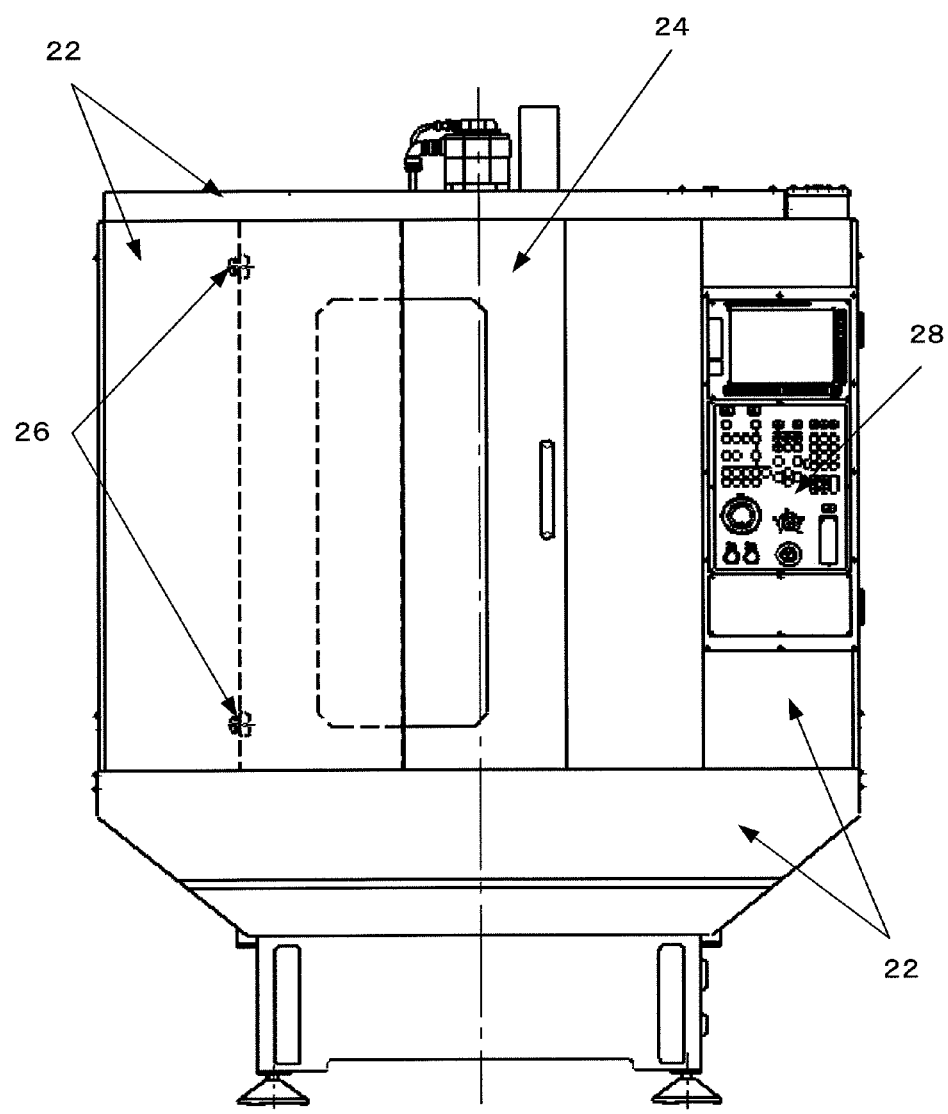
FIG. 1 is a view explaining an embodiment of a cover structure of a machine tool according to the present invention, in which a slide door is provided inside the machine tool and is opened.

As shown in FIG. 1, the inside portion of a machine tool, which serves as a machining space of the machine tool, is surrounded by a fixed cover 22 so as to be isolated from the outside of the machine tool. An opening portion is provided on the fixed cover 22, and a one-side opening type slide door 24 for operations, such as taking a workpiece into and out of the machining space, is provided in the opening portion. Electronic devices 28, such as a numerical controller (CNC) and an operation panel, are attached to the side surface of the fixed cover 22.

Figure 2:
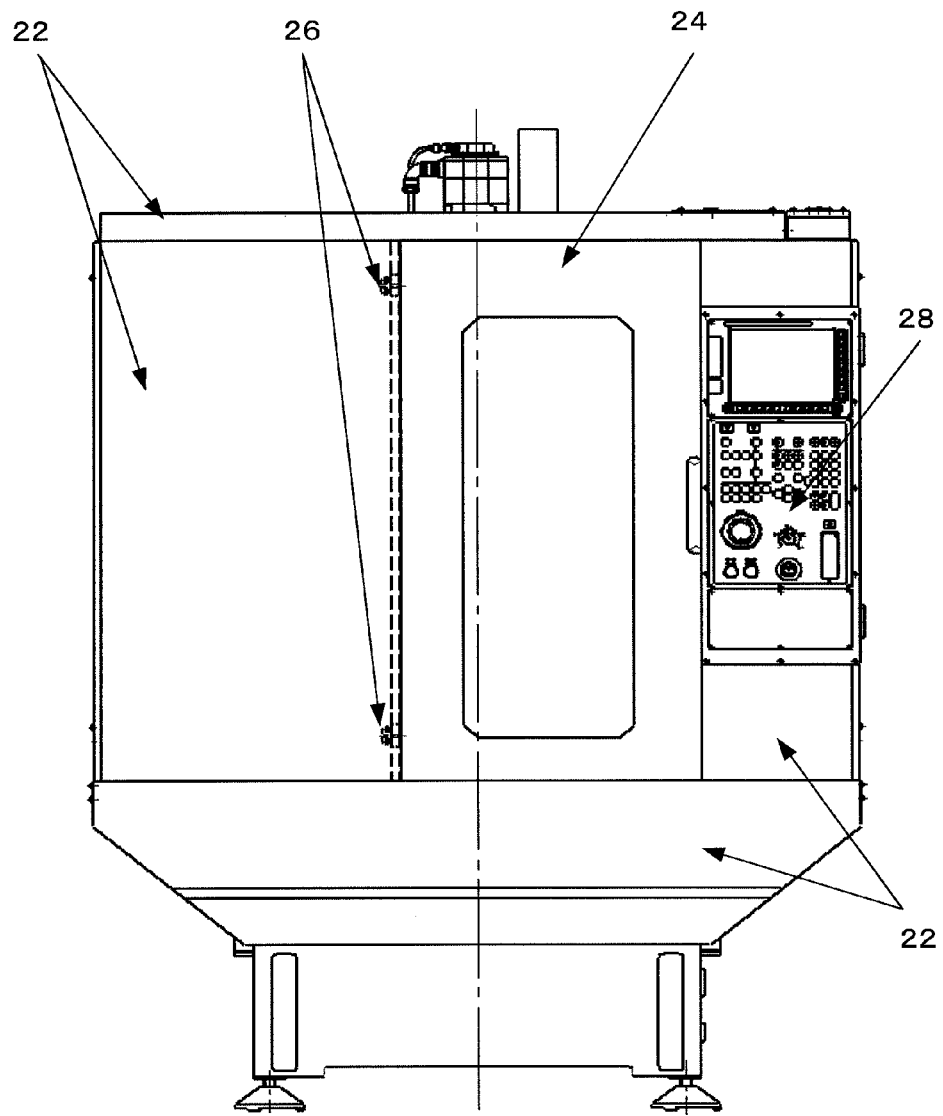
FIG. 2 is a view explaining a state where the slide door of FIG. 1 is closed.
Figure 3:
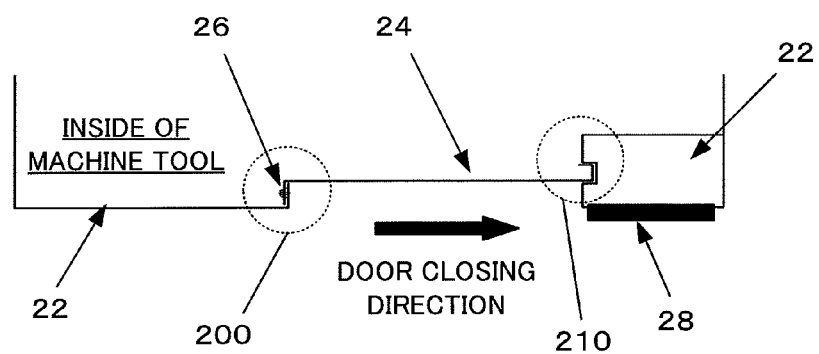
FIG. 3 is a view explaining a cross section of the cover structure of the machine tool of FIG. 2.

As shown in FIG. 2 and FIG. 3, shock absorbing members 26 are attached to the slide door 24 so as to prevent occurrence of a shock caused by a collision between the closing-direction-side end surface of the slide door 24 and the slide-door-closing-side end surface of the opening portion of the fixed cover 22 when the slide door 24 is closed. Further, a stop structure portion in the cover structure of the machine tool is formed by the shock absorbing member 26, and a portion of the fixed cover 22 or a member provided on the fixed cover 22, the portion or the member receiving the shock absorbing member 26 of the slide door 24 at the time when the opening portion of the fixed cover 22 is closed by closing the slide door 24. For example, as shown in FIG. 3, the side end surface of the opening portion of the fixed cover 22, and the side end surface of the slide door 24 are respectively formed to have an L-shape and an inverted L-shape. When the slide door 24 is moved in the closing direction, the stop structure portion stops the closing-side end surface of the slide door 24 at a predetermined distance away from the closing-side end surface of the opening portion of the fixed cover 22.

The shock absorbing member 26 is attached to the slide door 24 in FIG. 1 to FIG. 3, but may also be attached to the slide-door-opening side end surface of the opening portion of the fixed cover 22. Alternatively, the shock absorbing member 26 may be attached to both of the slide-door-opening-side end surface of the opening portion of the fixed cover 22, and the opening-side end surface of the slide door 24.

Further, when the opening portion of the fixed cover 22 is closed by the slide door 24, the shock absorbing member 26 attached to the slide door 24 is brought into contact with the end surface of the fixed cover 22 in the portion indicated by reference numeral 200 as shown in FIG. 3, but the closing-direction-side end surface of the slide door 24 is not brought into contact with the slide-door-closing-side end surface of the opening portion of the fixed cover 22 in the portion indicated by reference numeral 210.

With this structure, the portion, at which a shock is generated at the time when the slide door 24 is closed, is kept away from the portion to which the electronic devices 28 are attached. Thereby, it is possible to reduce the shock transmitted to the electronic devices 28. Note that the predetermined distance of the gap formed in the portion indicated by reference numeral 210 is set to a minute value so that the safety of the operator and the prevention of chips and coolant from scattering around the machine tool are not affected by the presence of the gap.

Note that the cover structure of the machine tool can also be configured, without the shock absorbing member 26 arranged between the fixed cover 22 and the slide door 24, such that, even when the side end surface of the opening portion of the fixed cover 22 is brought into contact with the side end surface of the slide door 24 in the portion indicated by reference numeral 200, the side end surface of the fixed cover 22 is not brought into contact with the side end surface of the slide door 24 in the portion indicated by reference numeral 210. However, in this case, the noise generated by the collision between the side end surface of the fixed cover 22 and the side end surface of the slide door 24 in the portion indicated by reference numeral 200 becomes large as compared with the case where the shock absorbing member 26 is arranged between the fixed cover 22 and the slide door 24.

<Cover Structure of Machine Tool with Slide Door Provided Outside Machine Tool>

Next, an embodiment of a cover structure of a machine tool according to the present invention, in which a slide door is provided outside the machine tool, is described with reference to FIG. 4 to FIG. 6.

Figure 4:
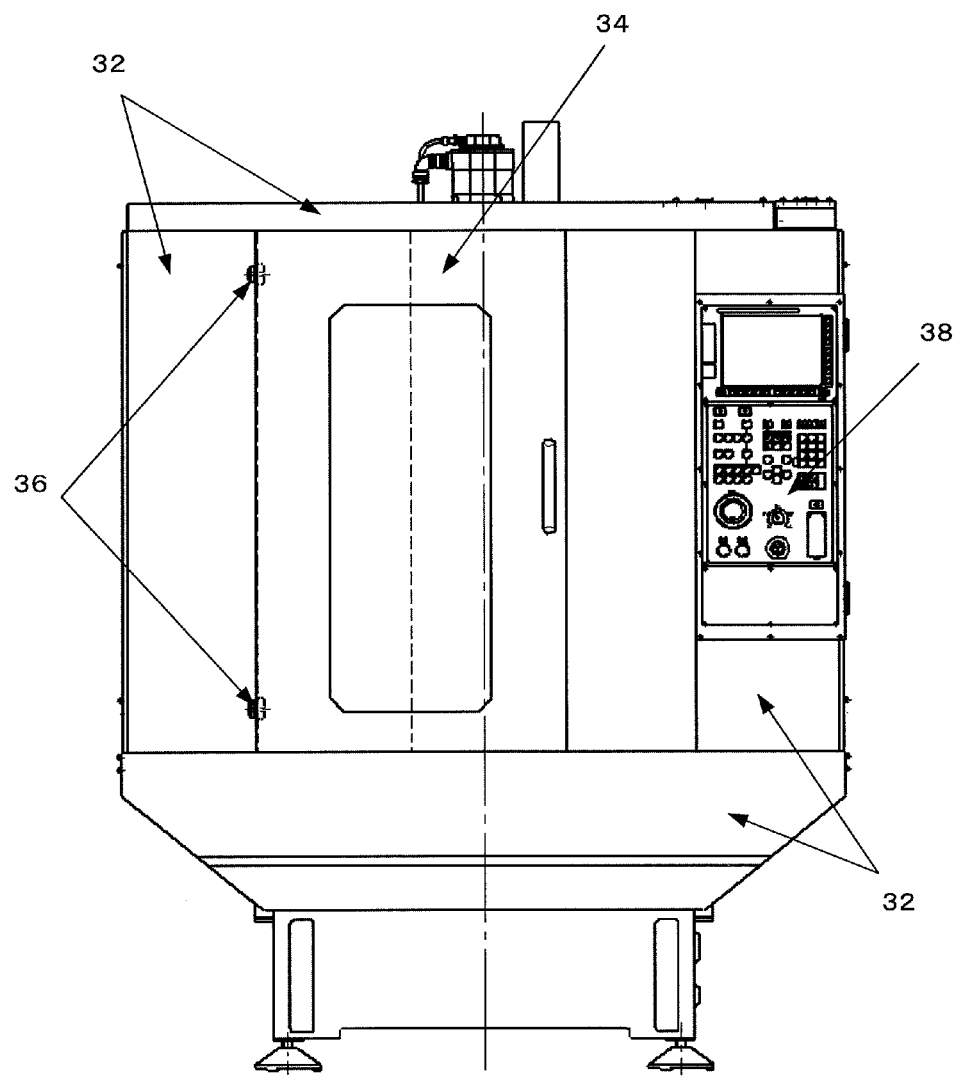
FIG. 4 is a view explaining an embodiment of a cover structure of a machine tool according to the present invention, in which a slide door is provided outside the machine tool and is opened.

As shown in FIG. 4, the inside portion of a machine tool, which serves as a machining space of the machine tool, is surrounded by a fixed cover 32 so as to be isolated from the outside of the machine tool. An opening portion is provided on the fixed cover 32, and a one-side opening type slide door 34 for operations, such as taking a workpiece into and out of the machining space, is provided in the opening portion. Electronic devices 38, such as a numerical controller (CNC) and an operation panel, are attached to the side surface of the fixed cover 32.

Figure 5:
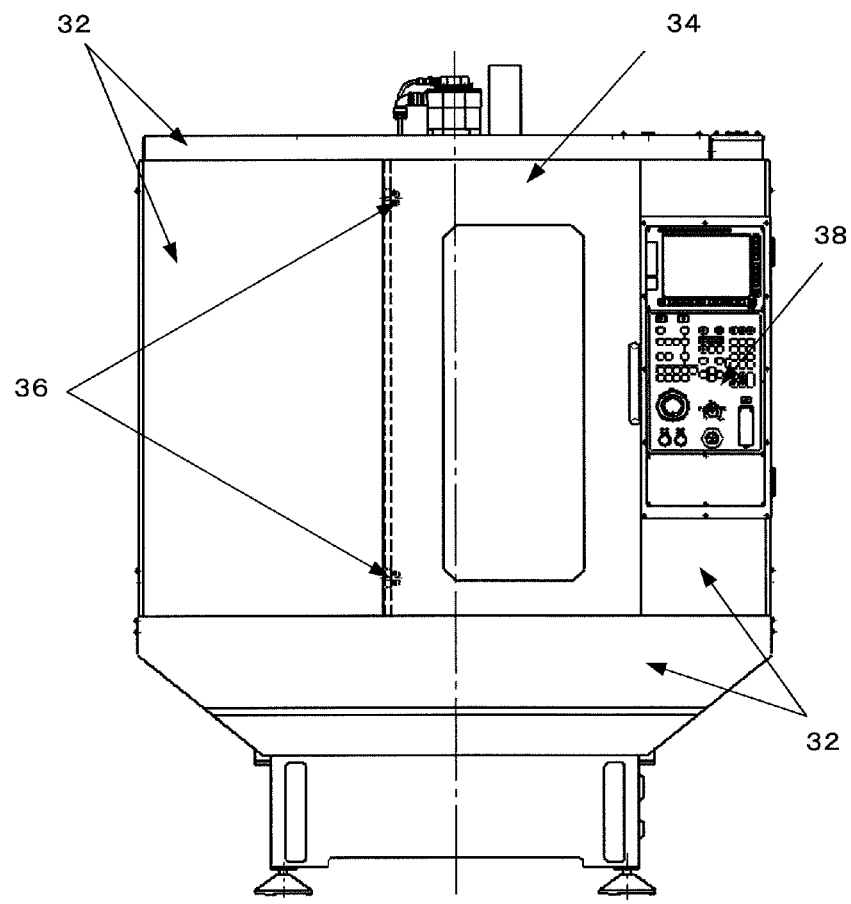
FIG. 5 is a view explaining a state where the slide door of FIG. 4 is closed.
Figure 6:
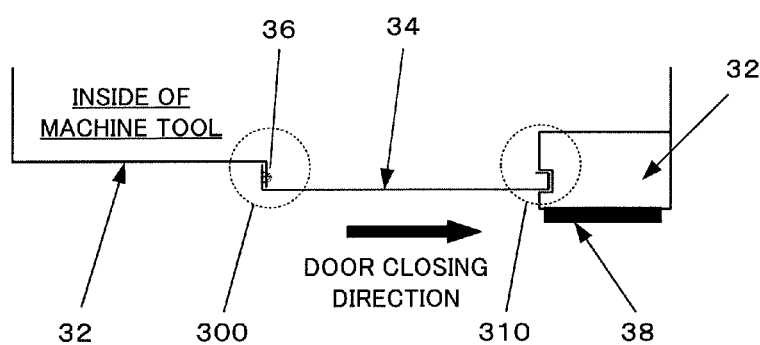
FIG. 6 is a view explaining a cross section of the cover structure of the machine tool of FIG. 4.

As shown in FIG. 5 and FIG. 6, a shock absorbing member 36 is attached to the slide door 34 so as to prevent occurrence of a shock caused by a collision between the closing-direction-side end surface of the slide door 34 and the slide-door-closing-side end surface of the opening portion of the fixed cover 32 when the slide door 34 is closed. Further, a stop structure portion in the cover structure of the machine tool is formed by the shock absorbing member 36, and a portion of the fixed cover 32 or a member provided on the fixed cover 32, the portion or the member receiving the shock absorbing member 36 of the slide door 34 at the time when the opening portion of the fixed cover 32 is closed by closing the slide door 34. When the slide door 34 is moved in the closing direction, the stop structure portion stops the closing-side end surface of the slide door 34 at a predetermined distance away from the closing-side end surface of the opening portion of the fixed cover 32.

The shock absorbing member 36 is attached to the slide door 34 in FIG. 4 to FIG. 6, but may also be attached to the slide-door-opening side end surface of the opening portion of the fixed cover 32. Alternatively, the shock absorbing member 36 may be attached to both of the slide-door-opening-side end surface of the opening portion of the fixed cover 32, and the opening-side end surface of the slide door 34.

Further, when the opening portion of the fixed cover 32 is closed by the slide door 34, the shock absorbing member 36 attached to the slide door 34 is brought into contact with the end surface of the fixed cover 32 in the portion indicated by reference numeral 300 as shown in FIG. 6, but the closing-direction-side end surface of the slide door 34 is not brought into contact with the slide-door-closing-side end surface of the opening portion of the fixed cover 32 in the portion indicated by reference numeral 310.

With this structure, the portion, at which a shock is generated at the time when the slide door 34 is closed, is kept away from the portion to which the electronic devices 38 are attached. Thereby, it is possible to reduce the shock transmitted to the electronic devices 38. Note that the predetermined distance of the gap formed in the portion indicated by reference numeral 310 is set to a minute value so that the safety of the operator and the prevention of chips and coolant from scattering around the machine tool are not affected by the presence of the gap.

Note that the cover structure of the machine tool can also be configured, without arranging the shock absorbing member 36 between the fixed cover 32 and the slide door 34, such that, even when the side end surface of the opening portion of the fixed cover 32 is brought into contact with the side end surface of the slide door 34 in the portion indicated by reference numeral 300, the side end surface of the fixed cover 32 is not brought into contact with the side end surface of the slide door 34 in the portion indicated by reference numeral 310. However, in this case, the noise generated by the collision between the side end surface of the fixed cover 32 and the side end surface of the slide door 34 in the portion indicated by reference numeral 300 becomes large as compared with the case where the shock absorbing member 36 is arranged between the fixed cover 32 and the slide door 34.

<Cover Structure of Machine Tool with Two Slide Doors Provided Outside Machine Tool>

An embodiment of a cover structure of a machine tool according to the present invention, in which two slide doors are provided inside the machine tool, is described with reference to FIG. 7 to FIG. 9.

Figure 7:
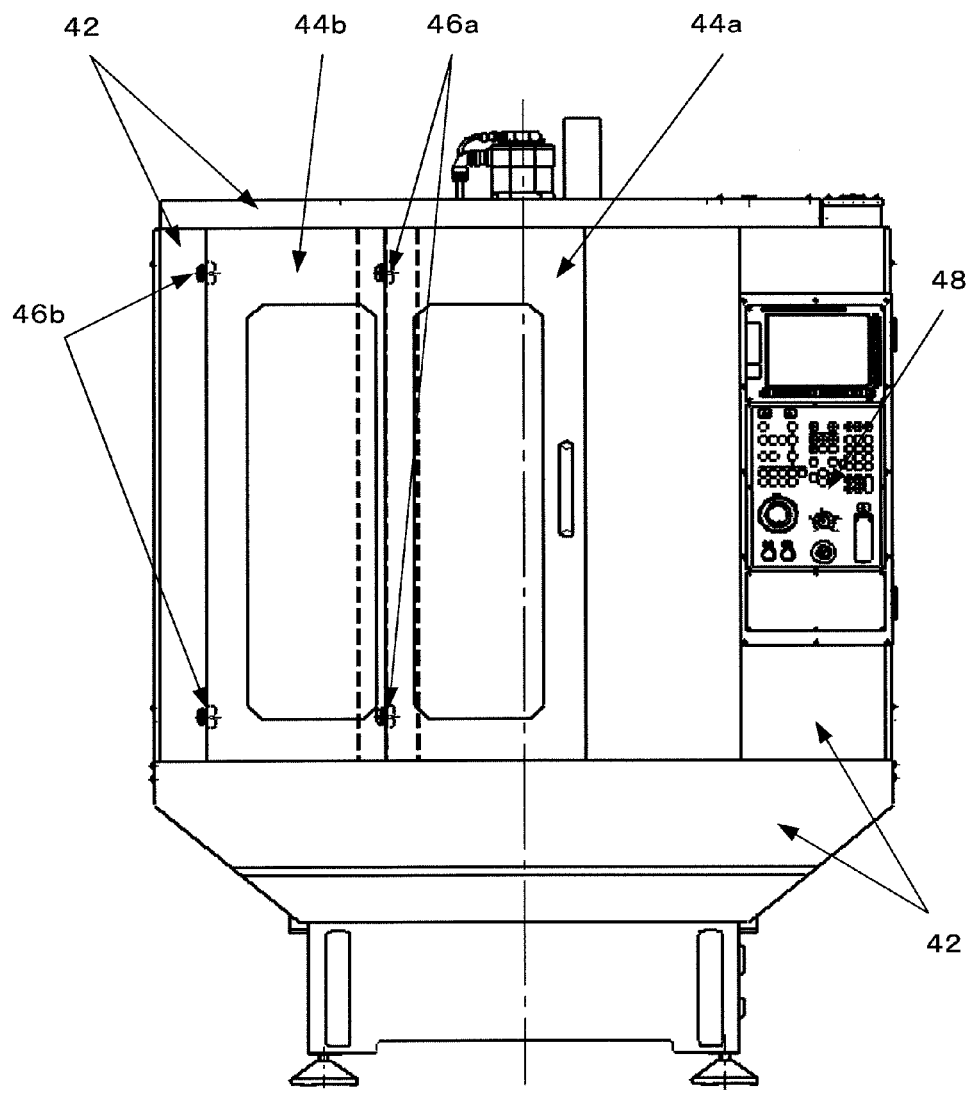
FIG. 7 is a view explaining an embodiment of a cover structure of a machine tool according to the present invention, in which two slide doors are provided outside the machine tool and are opened.

As shown in FIG. 7, the inside portion of a machine tool, which serves as a machining space of the machine tool, is surrounded by a fixed cover 42 so as to be isolated from the outside of the machine tool. An opening portion is provided on the fixed cover 42, and two slide doors 44a and 44b for operations, such as taking a workpiece into and out of the machining space, are provided in the opening portion. Electronic devices 48, such as numerical controller (CNC) and an operation panel, are attached to the side surface of the fixed cover 42.

Figure 8:
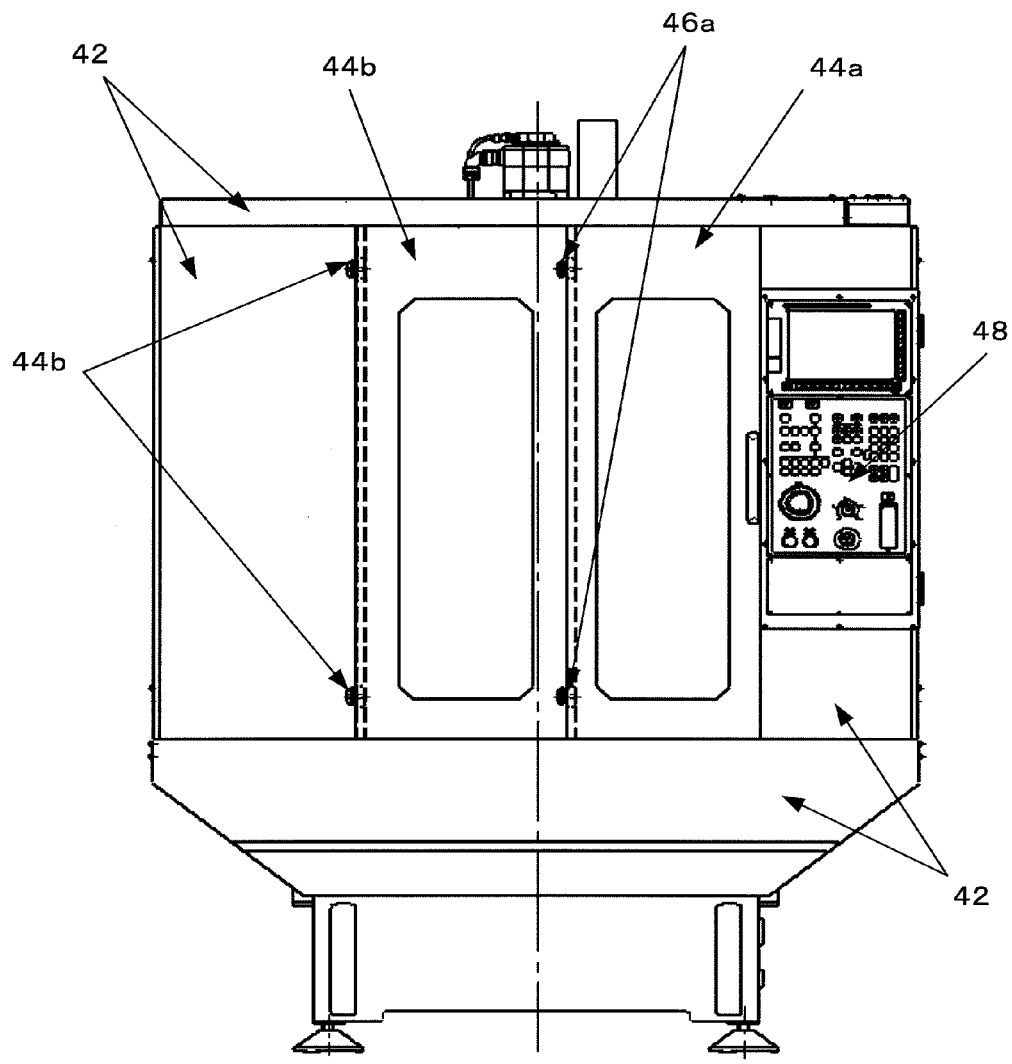
FIG. 8 is a view explaining a state where the slide doors of FIG. 7 are closed.
Figure 9:
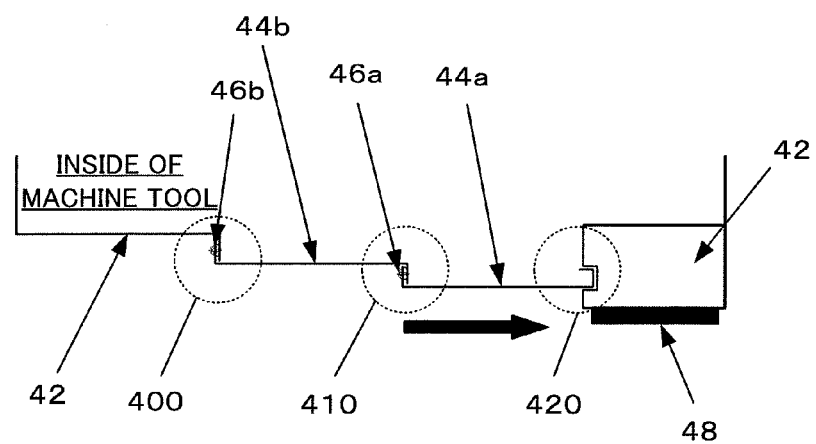
FIG. 9 is a view explaining a cross section of the cover structure of the machine tool of FIG. 7.

As shown in FIG. 8 and FIG. 9, shock absorbing members 46a and 46b are respectively attached to the slide doors 44a and 44b so as to prevent occurrence of a shock caused by a collision between the closing-direction-side end surface of the one slide door 44a and the slide-door-closing-side end surface of the opening portion of the fixed cover 42 when the slide doors 44a and 44b are closed. Further, a stop structure portion in the cover structure of the machine tool is formed by the shock absorbing members 46a and 46b, a portion of the slide door 44b or a member provided on the slide door 44b, the portion or the member receiving the shock absorbing member 46a of the slide door 44a at the time when the opening portion of the fixed cover 42 is closed by closing the slide doors 44a and 44b, and a portion of the fixed cover 42 or a member provided on the fixed cover 42, the portion or the member receiving the shock absorbing member 46b of the slide door 44b at the time when the opening portion of the fixed cover 42 is closed by closing the slide doors 44a and 44b. When the slide doors 44a and 44b are moved in the closing direction, the stop structure portion stops the closing-side end surface of the slide door 44a at a predetermined distance away from the closing-side end surface of the opening portion of the fixed cover 42. The member shown in FIG. 14, FIG. 16, FIG. 15 and FIG. 17 is used as the shock absorbing members 46a and 46b.

The shock absorbing members 46a and 46b are attached to the respective portion of the slide doors 44a and 44b other than the closing-direction-side end surface of the slide doors in FIG. 7 to FIG. 9. However, the shock absorbing member 46a may be attached to the closing-direction-side end surface of the slide door 44b, and the shock absorbing member 46b may also be attached to the slide-door-opening-side end surface of the opening portion of the fixed cover 42.

Further, in the case where the opening portion of the fixed cover 42 is closed by the slide doors 44a and 44b, as shown in FIG. 9, even when the shock absorbing member 46b attached to the slide door 44b is brought into contact with the end surface of the fixed cover 42 in the portion indicated by reference numeral 400, and when the shock absorbing member 46a attached to the slide door 44a is brought into contact with the closing-direction-side end surface of the slide door 44b in the portion indicated by reference numeral 410, the closing-direction-side end surface of the slide door 44a is not brought into contact with the slide-door-closing-side end surface of the opening portion of the fixed cover 42 in the portion indicated by reference numeral 420.

With this structure, the portion, at which a shock is generated at the time when the slide doors 44a and 44b are closed, is kept away from the portion to which the electronic devices 48 are attached. Thereby, it is possible to reduce the shock transmitted to the electronic devices 48. Note that the predetermined distance of the gap formed in the portion indicated by reference numeral 420 is set to a minute value so that the safety of the operator and the prevention of chips and coolant from scattering around the machine tool are not affected by the presence of the gap.

Note that the cover structure of the machine tool can also be configured, without arranging the shock absorbing members 46a and 46b arranging between the slide doors 44a and 44b and between the fixed cover 42 and the slide door 44b, respectively, such that the side end surface of the opening portion of the fixed cover 42 is brought into contact with the side end face of the slide door 44b in the portion indicated by reference numeral 400, such that the opening-direction-side side end surface of the slide door 44a is brought into contact with the closing-direction-side side end surface of the slide door 44b in the portion indicated by reference numeral 410, and such that the side end surface of the fixed cover 42 is not brought into contact with the side end surface of the slide door 44a in the portion indicated by reference numeral 420. However, in this case, the noise which is generated by the collision between the side end surface of the fixed cover 42 and the side end surface of the slide door 44b in the portion indicated by reference numeral 400, and which is generated by the collision between the side end surface of the slide door 44a and the side end surface of the slide door 44b in the portion indicated by reference numeral 410 becomes large as compared with the case where the shock absorbing members 46a and 46b are respectively arranged between the slide doors 44a and 44b, and between the fixed cover 42 and the slide door 44b.

<Cover Structure of Machine Tool with Stop Structure Portion Provided Above and/or Below Opening Portion of Fixed Cover>

Next, an embodiment of a cover structure of a machine tool according to the present invention, in which a stop structure portion is provided at a position above and/or below an opening portion of a fixed cover, is described with reference to FIG. 10 to FIG. 11.

Figure 10:
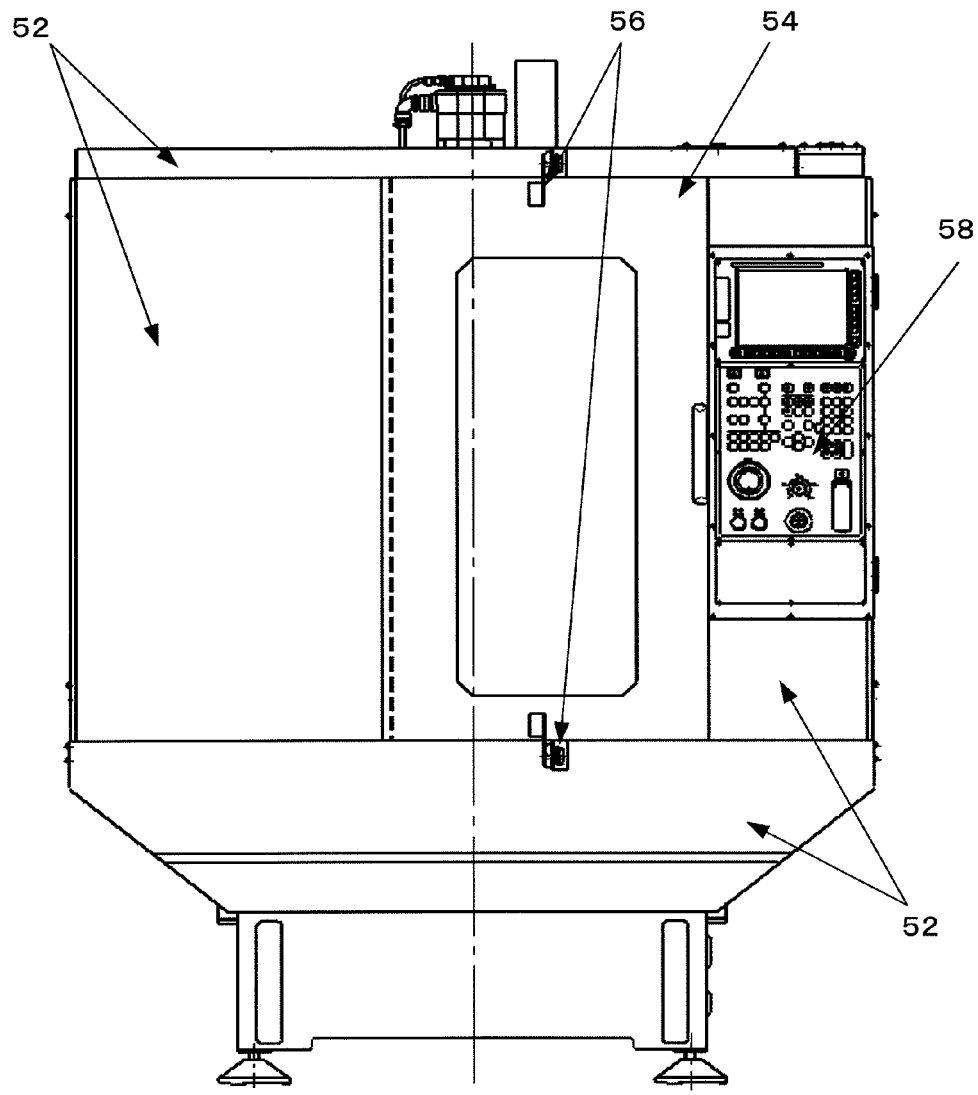
FIG. 10 is a view explaining an embodiment of a cover structure of a machine tool according to the present invention, in which a stop structure portion is provided at a position above and/or below an opening portion of a fixed cover.

As shown in FIG. 10, the inside portion of a machine tool, which serves as a machining space of the machine tool, is surrounded by a fixed cover 52 so as to be isolated from the outside of the machine tool. An opening portion is provided on the fixed cover 52, and a slide door 54 for operations, such as taking a workpiece into and out of the machining space, is provided in the opening portion. Electronic devices 58, such as a numerical controller (CNC) and an operation panel, are attached to the side surface of the fixed cover 52.

Figure 11:
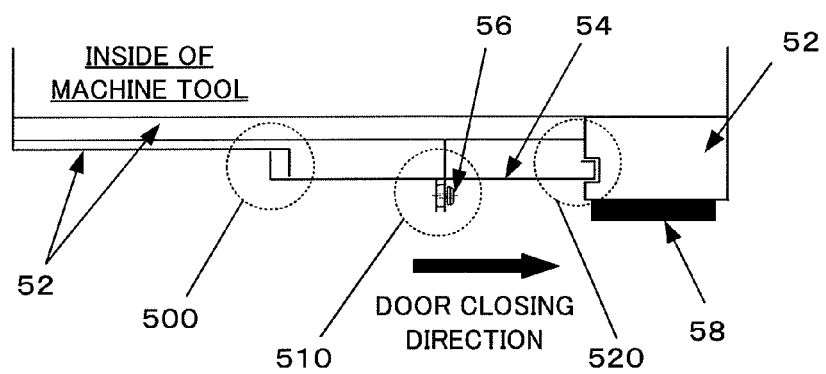
FIG. 11 is a view explaining a cross section of the cover structure of the machine tool of FIG. 10.

As shown in FIG. 11, shock absorbing members 56 are attached to the fixed cover 52 so as to prevent occurrence of a shock caused by a collision between the closing-direction-side end surface of the slide door 54 and the slide-door-closing-side end surface of the opening portion of the fixed cover 52 when the slide door 54 is closed. The shock absorbing members are respectively fixed to metal fittings vertically provided at positions above and below the opening portion of the fixed cover 52. Also, metal fittings for respectively receiving the shock absorbing members 56 are attached to the slide door 54. Further, a stop structure portion in the cover structure of the machine tool is formed by the shock absorbing members 56, and portions of the slide door 54 or members provided on the slide door 54, the members or the portions respectively receiving the shock absorbing members 56 of the slide door 54 at the time when the opening portion of the fixed cover 52 is closed by closing the slide door 54. The stop structure portion is arranged in the direction crossing the moving direction (opening and closing direction) of the slide door 54, and is provided, as shown in FIG. 10 and FIG. 11, at a position above or below (or at positions above and below) the opening portion of the fixed cover 52.

When the slide door 54 is moved in the closing direction, the stop structure portion stops the closing-side end surface of the slide door 54 at a predetermined distance away from the closing-side end surface of the opening portion of the fixed cover 52. The member shown in FIG. 14, FIG. 16, FIG. 15 and FIG. 17 is used as the shock absorbing member 56.

The shock absorbing member 56 is attached to the fixed cover 52 in FIG. 10 and FIG. 11, but may also be attached to the slide door 54. Alternatively, the shock absorbing member 56 may be attached to both of the fixed cover 52 and the slide door 54.

Further, when the opening portion of the fixed cover 52 is closed by the slide door 54, the shock absorbing member 56 attached to the fixed cover 52 is brought into contact with the member attached to the slide door 54 in the portion indicated by reference numeral 510 as shown in FIG. 11, but the opening-direction-side end surface of the slide door 54 is not brought into contact with the slide-door-opening-direction-side end surface of the fixed cover 52 in the portion indicated by reference numeral 500, and also the closing-direction-side end surface of the slide door 54 is not brought into contact with the slide-door-closing-side end surface of the opening portion of the fixed cover 52 in the portion indicated by reference numeral 520.

With this structure, the portion, at which a shock is generated at the time when the slide door 54 is closed, is kept away from the portion to which the electronic devices 58 are attached. Thereby, it is possible to reduce the shock transmitted to the electronic devices 58. Note that the predetermined distance of the gap formed in the portion indicated by reference numeral 520 is set to a minute value so that the safety of the operator and the prevention of chips and coolant from scattering around the machine tool are not affected by the presence of the gap.

<Cover Structure of Machine Tool, Configured to Enable Shock Absorbing Member to be Attached to and Detached From Outside of Machine Tool>

Next, an embodiment of a cover structure of a machine tool according to the present invention, in which a shock absorbing member can be attached to and detached from the outside of the machine tool, is described with reference to FIG. 12 and FIG. 13.

Figure 12:
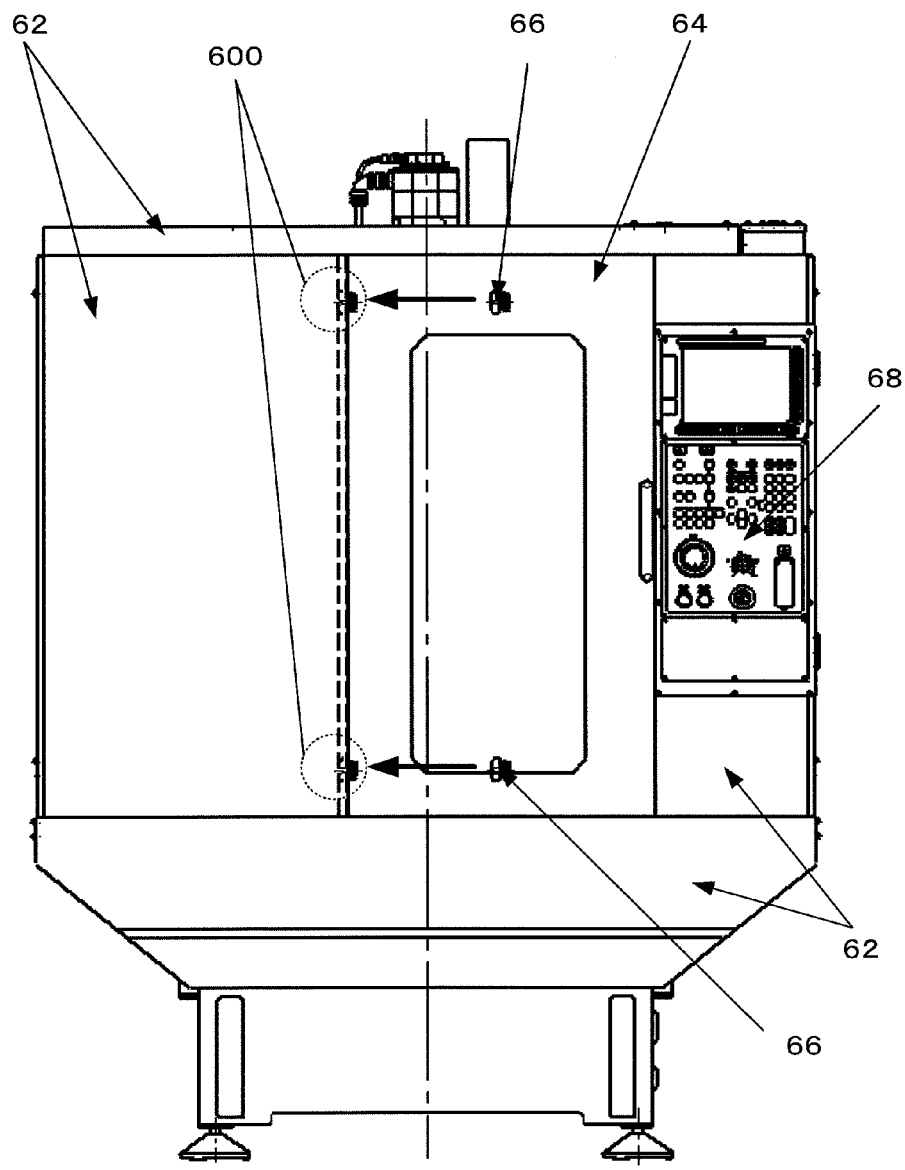
FIG. 12 is a view explaining an embodiment of a cover structure of a machine tool according to the present invention, in which a shock absorbing member can be attached to and detached from the outside of the machine tool, and in which a slide door is provided inside the machine tool.

In the example shown in FIG. 12, a slide door is provided inside the machine tool. As shown in FIG. 12, the inside portion of a machine tool, which serves as a machining space of the machine tool, is surrounded by a fixed cover 62. An opening portion is provided on the fixed cover 62, and a slide door 64 for operations, such as taking a workpiece into and out of the machining space, is provided in the opening portion. Electronic devices 68, such as a numerical controller (CNC) and an operation panel, are attached to the side surface of the fixed cover 62.

Figure 14:
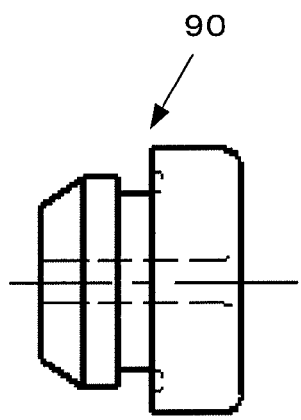
FIG. 14 is a view explaining an example of a shock absorbing member made of cushion rubber or cushion sponge and used in the embodiment of the cover structure according to the present invention.
Figure 15:
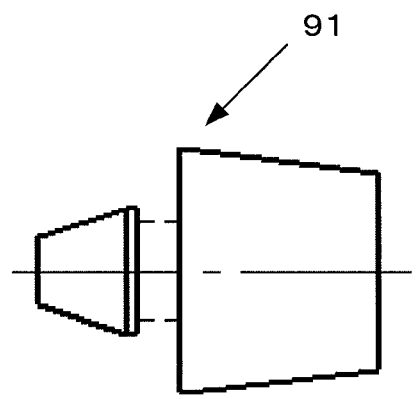
FIG. 15 is a view explaining an example of a shock absorbing member made of cushion rubber or cushion sponge and used in the embodiment of the cover structure according to the present invention.

Further, in order to prevent occurrence of a shock caused by a collision between the closing-direction-side end surface of the slide door 64 and the slide-door-closing-side end surface of the opening portion of the fixed cover 62 when the opening portion is closed by closing the slide door 64, shock absorbing members 66 are respectively attached to side surface portions (indicated by reference numeral 600) of the opening portion of the fixed cover 62, which are located on the opening direction side of the slide door 64. The shock absorbing member 66 can be attached to and detached from the fixed cover 62 from the outside of the machine tool as shown by the arrow of FIG. 12. The member shown in each of FIG. 14 and FIG. 15 is used as the shock absorbing member 66. The shock absorbing member 66 configures a stop structure portion in the cover structure of the machine tool.

Figure 13:
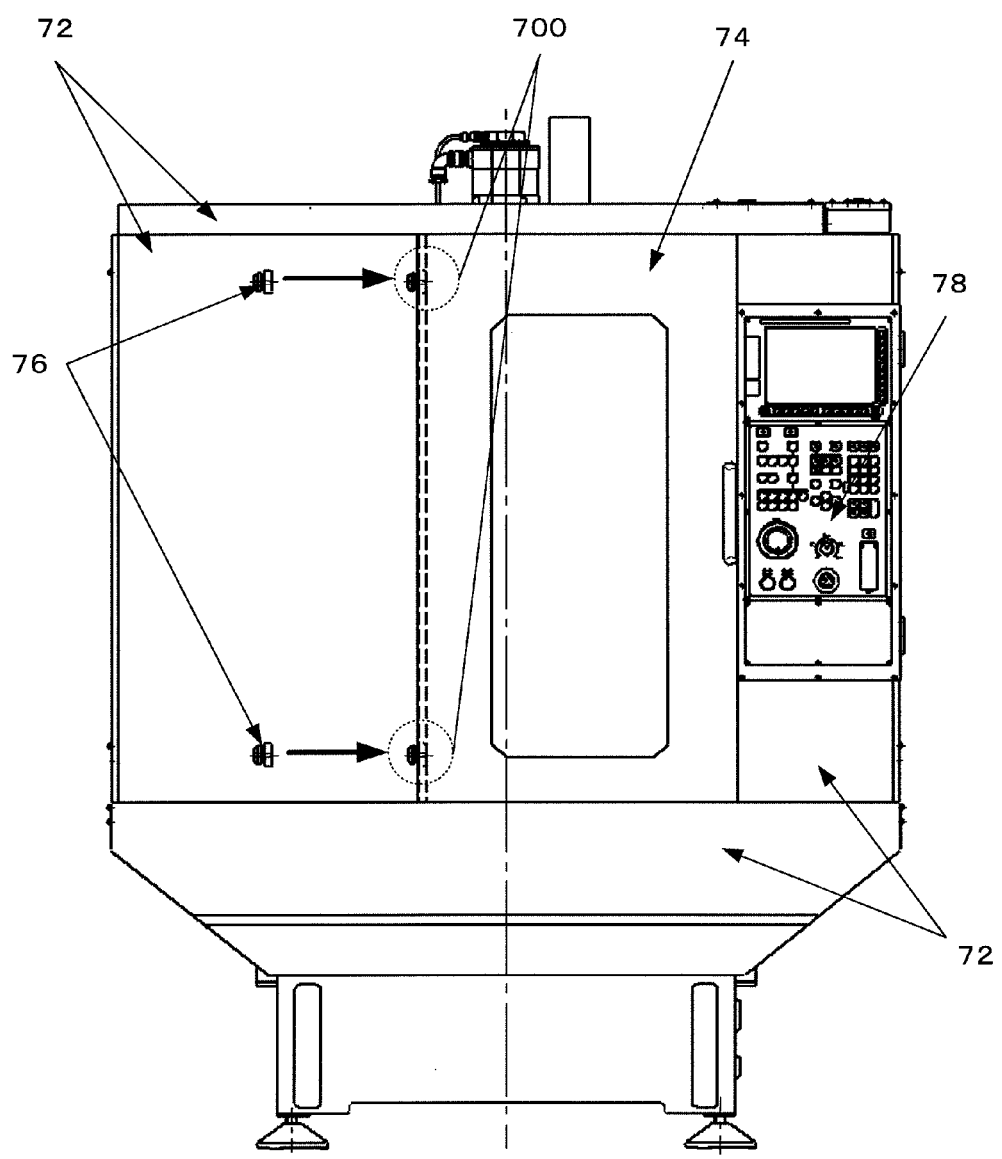
FIG. 13 is a view explaining an embodiment of a cover structure of a machine tool according to the present invention, in which a shock absorbing member can be attached to and detached from the outside of the machine tool, and in which a slide door is provided outside the machine tool.

In the example shown in FIG. 13, the slide door is provided outside the machine tool. A fixed cover 72 surrounds the inside of the machine tool as shown in FIG. 13. An opening portion is provided on the fixed cover 72, and a slide door 74 for operations, such as taking a workpiece into and out of the machining space, is provided in the opening portion. Electronic devices 78, such as a numerical controller (CNC) and an operation panel, are attached to the side surface of the fixed cover 72.

Further, shock absorbing members 76 are respectively attached to side surface portions (indicated by reference numeral 700) on the opening direction side of the slide door 74 so as to prevent occurrence of a shock caused by a collision between the closing-direction-side end surface of the slide door 74 and the slide-door-closing-side end surface of the opening portion of the fixed cover 72 when the opening portion is closed by closing the slide door 74. The shock absorbing member 76 can be attached to and detached from the fixed cover 72 from the outside of the machine tool as indicated by the arrow. The member shown in each of FIG. 14 and FIG. 15 is used as the shock absorbing member 76. The shock absorbing member 76 configures a stop structure portion in the cover structure of the machine tool.

With the structure shown in each of FIG. 12 and FIG. 13, the portion, at which each of the slide doors 64 and 74 collides with each of the fixed covers 62 and 72, is kept away from each of the portions to which the electronic devices 68 and 78, such as the CNC and the operation panel, are attached. Thereby, it is possible to reduce the shock transmitted to the electronic devices 68 and 78. Further, in the prior art cover structure, the shock absorbing member, such as cushion rubber, which is attached to the slide-door-closing-direction end surface, is generally provided close to the inside of the machine tool. Therefore, the shock absorbing member is affected by coolant, chips, and the like, and thereby immature wearing and falling off of the shock absorbing member are caused. However, in the cover structure according to the present invention, the shock absorbing member, such as cushion rubber or cushion sponge, can also be attached at a portion which is located outside the machine tool and which is free from the influence of chips and coolant. Further, the shock absorbing member can also be easily exchanged from the outside of the machine tool.

<Example of Shock Absorbing Member Used in Cover Structure>

Next, examples of the shock absorbing member used in the above-described embodiments of the cover structure of the machine tool are described with reference to FIG. 14 to FIG. 21.

A shock absorbing member 90 shown in FIG. 14 is made of cushion rubber or cushion sponge, and has a substantially gourd shape with a narrowed central portion. Further, a cushioning material shown in FIG. 15 is also made of cushion rubber or cushion sponge, and has a substantially gourd shape with a narrowed central portion. The case where each of these shock absorbing members 90 and 91 is used as each of shock absorbing members 66 and 76 in the cover structure shown in each of FIG. 12 and FIG. 13 is described. In the cover structure shown in FIG. 12, a through hole, into which the shock absorbing member 90 or 91 is pushed from the outside of the machine tool, is formed at each of the side end portions of the fixed cover 62, which are indicated by reference numeral 600. When the shock absorbing member 90 or 91 is deteriorated and needs to be exchanged, the shock absorbing member 90 or 91 can be taken out from the outside of the machine tool.

Figure 16:
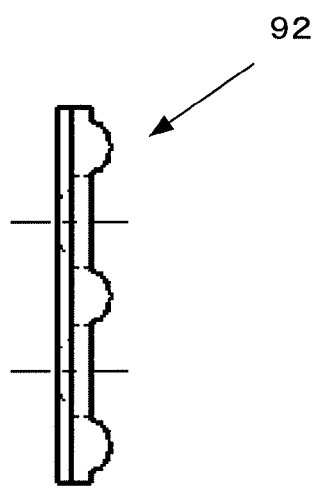
FIG. 16 is a view explaining an example of a metal plate to which cushion rubber or cushion sponge is fixed and which is used in the embodiment of the cover structure according to the present invention.
Figure 17:
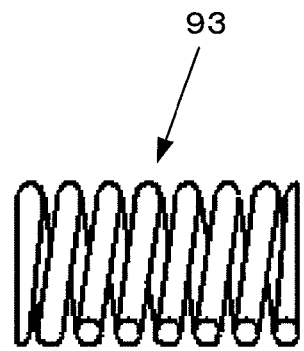
FIG. 17 is a view explaining an example of a shock absorbing member which is formed by a spring and which is used in the embodiment of the cover structure according to the present invention.
Figure 18:
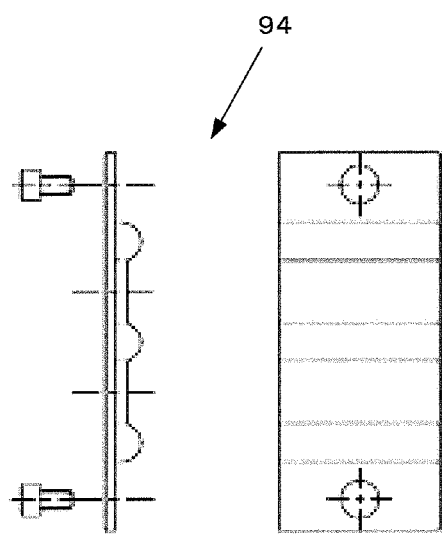
FIG. 18 is a view explaining an example of a shock absorbing member which is made of screw fixing type cushion rubber or screw fixing type cushion sponge and which is used in the embodiment of the cover structure according to the present invention.
Figure 19:
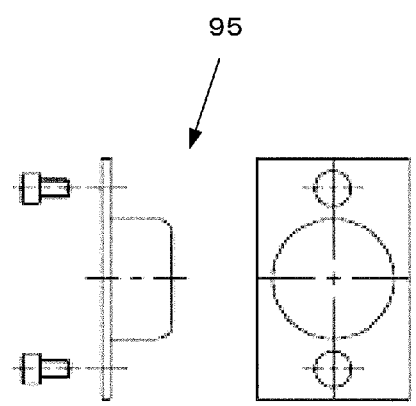
FIG. 19 is a view explaining an example of a shock absorbing member which is made of screw fixing type cushion rubber or screw fixing type cushion sponge and which is used in the embodiment of the cover structure according to the present invention.
Figure 20:
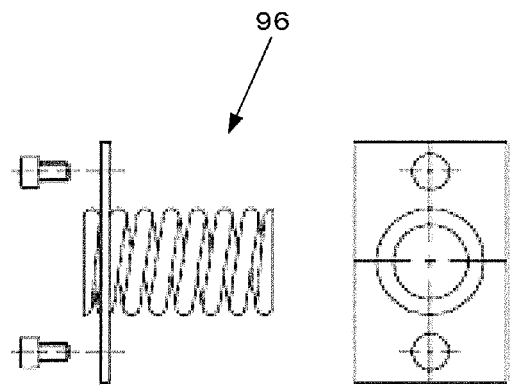
FIG. 20 is a view explaining an example of a shock absorbing member which is formed by a screw-fixing type spring and which is used in the embodiment of the cover structure according to the present invention.

A shock absorbing member 92 shown in FIG. 16 has a structure in which cushion rubber or cushion sponge is fixed to a metal plate. A shock absorbing member 93 shown in FIG. 17 is a shock absorbing member formed by a spring. Each of shock absorbing members 94 and 95 shown in FIG. 18 and FIG. 19 has a structure in which cushion rubber or cushion sponge is fixed to a metal plate, and in which the both ends of the metal plate can be screw-fastened to predetermined portions of the fixed cover or the slide door. FIG. 20 shows an example of a shock absorbing member 96 formed by a screw-fixing type spring, to one end portion of which a metal fitting for screwing is attached. The spring, serving as the shock absorbing member 96, is fixed to the fixed cover or the slide door via the metal fitting.

Figure 21:
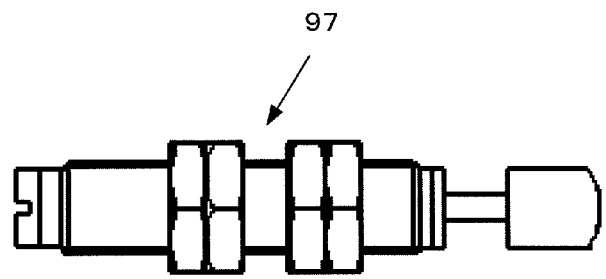
FIG. 21 is a view explaining an example of a shock absorber used in the embodiment of the cover structure according to the present invention.
Figure 22:
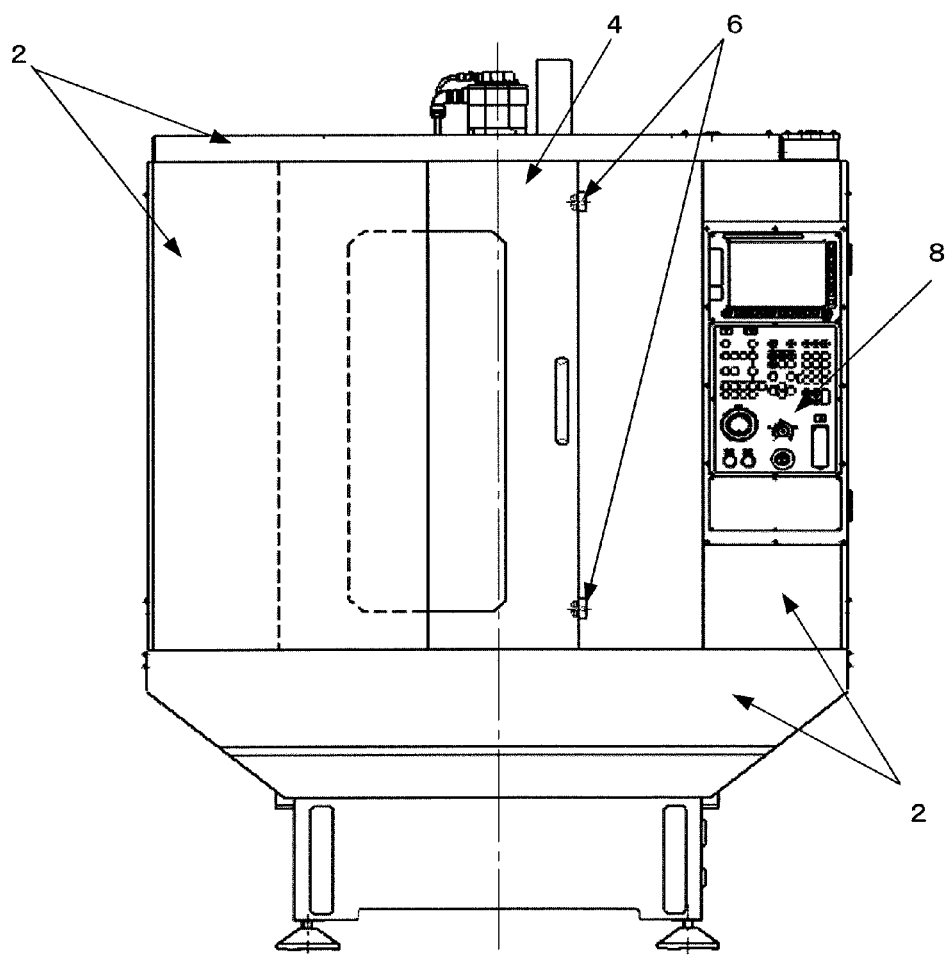
FIG. 22 is a view showing an example of a conventional cover structure of a machine tool, in which a slide door is provided inside the machine tool and is opened.
Figure 23:
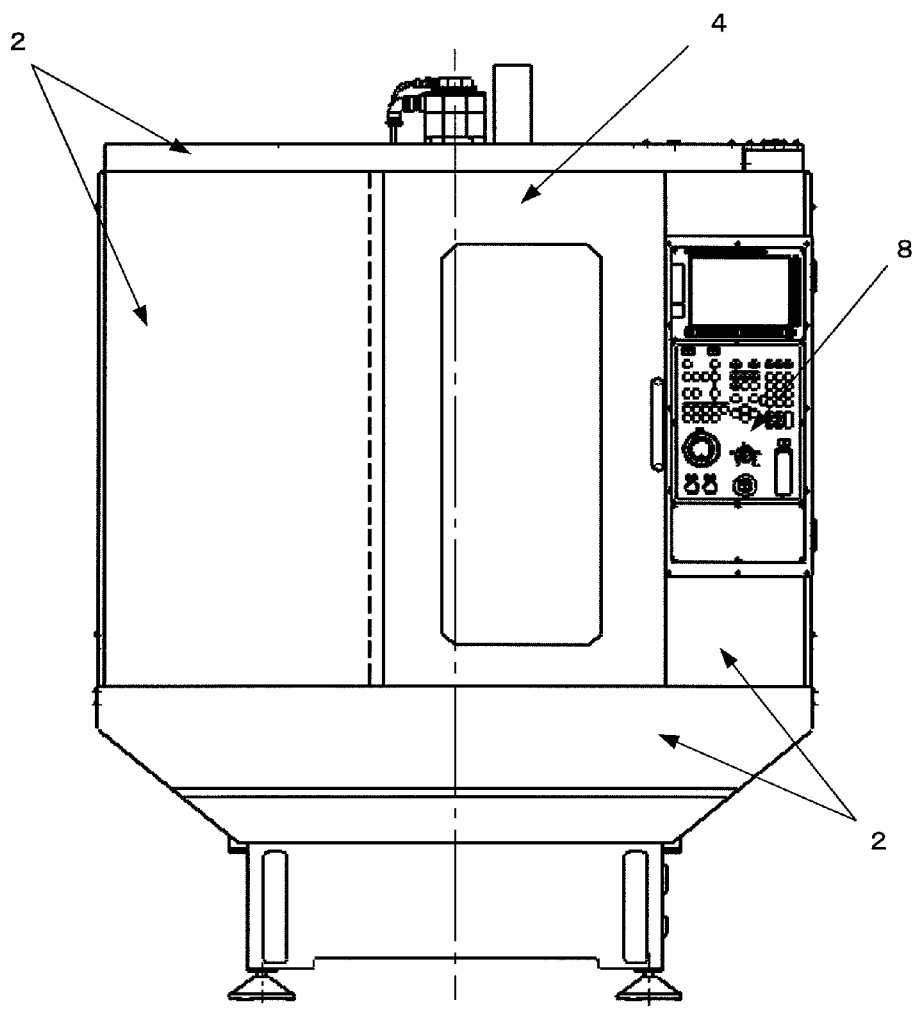
FIG. 23 is a view explaining a state where the slide door in the cover structure of FIG. 22 is closed.
Figure 24:
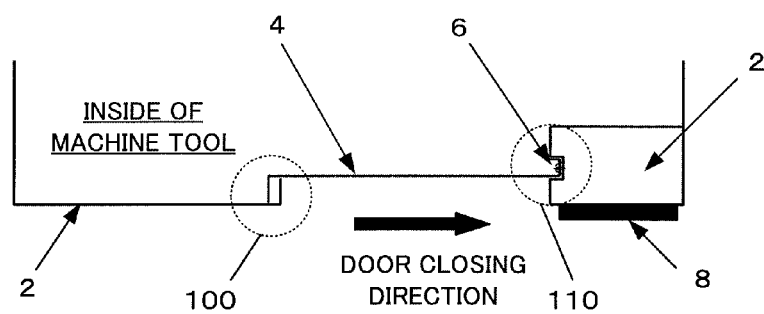
FIG. 24 is a view explaining a cross section of the cover structure of FIG. 23.
Figure 25:
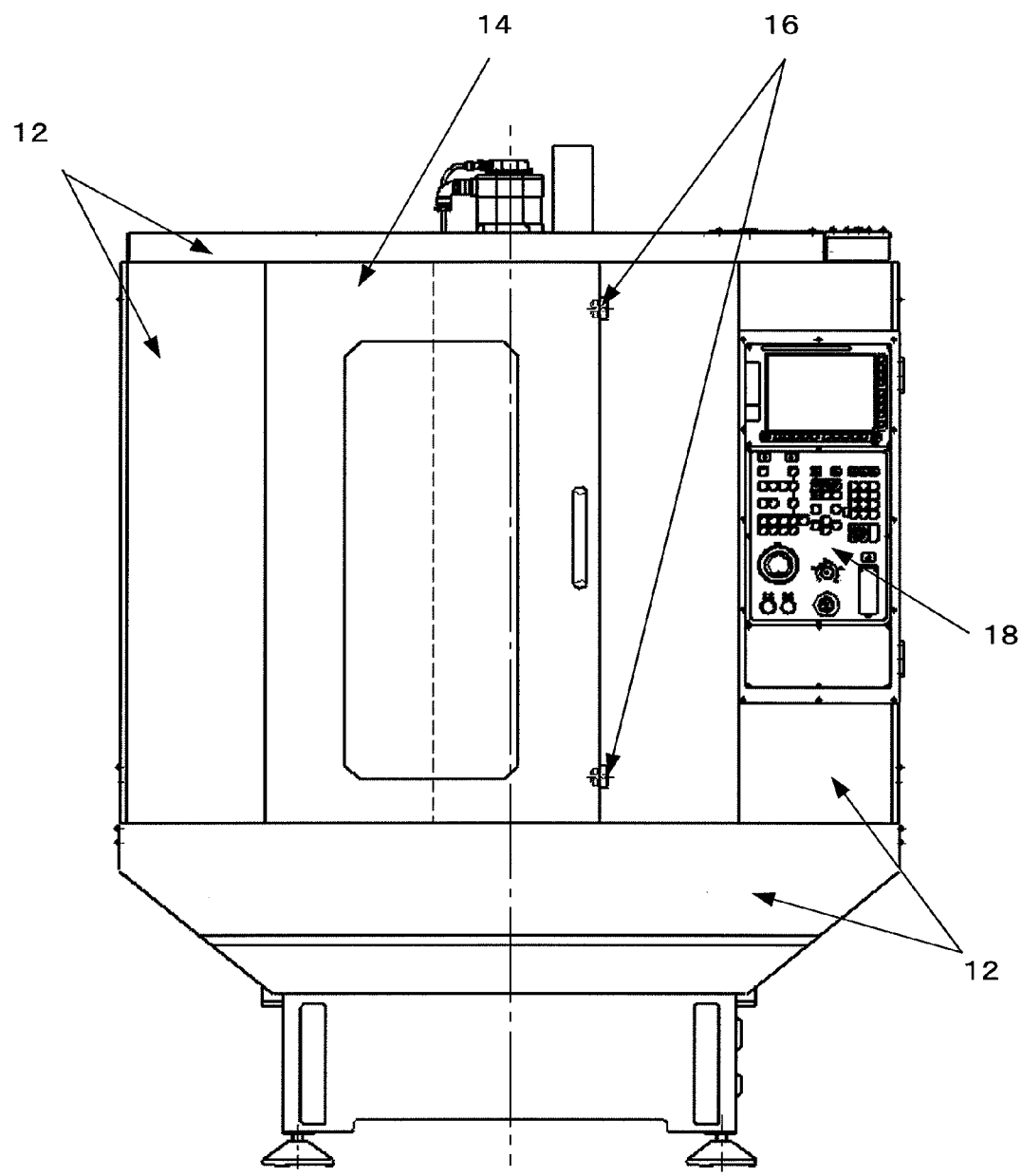
FIG. 25 is a view showing an example of a conventional cover structure of a machine tool, in which a slide door is provided outside the machine tool and is opened.
Figure 26:
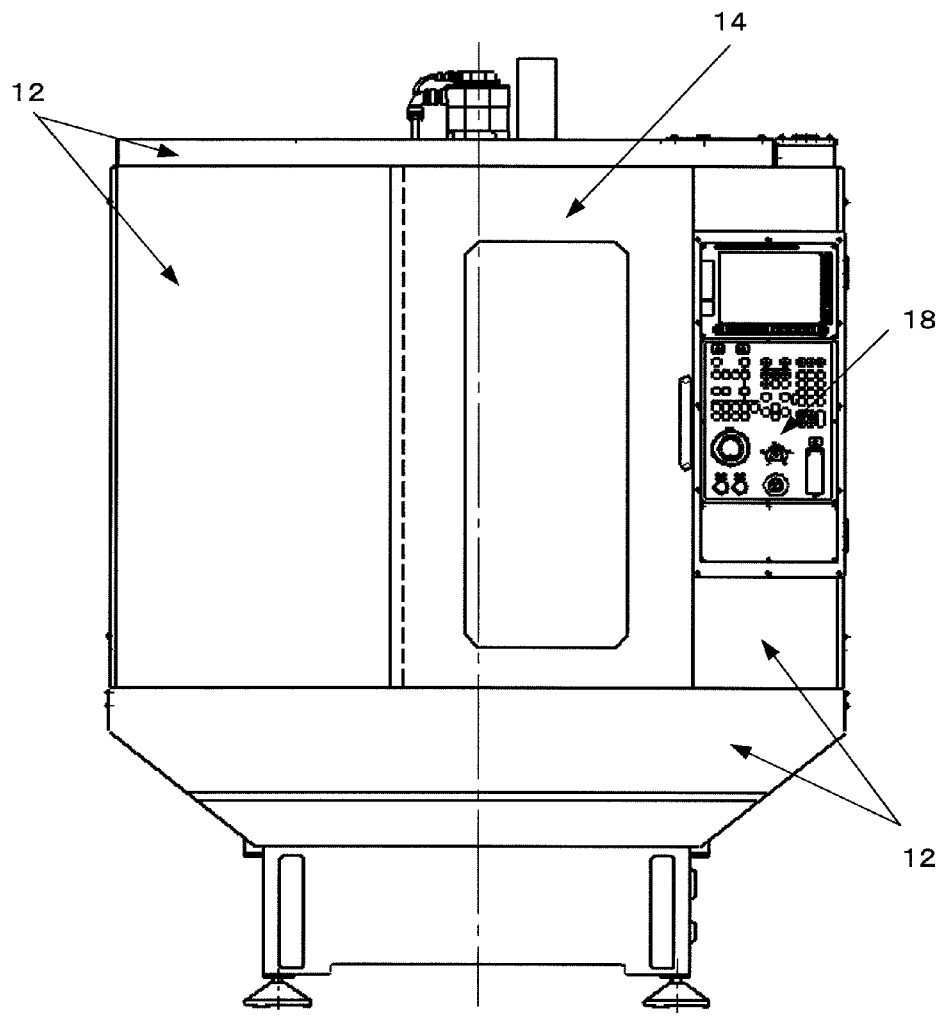
FIG. 26 is a view explaining a state where the slide door in the cover structure of FIG. 25 is closed.
Figure 27:
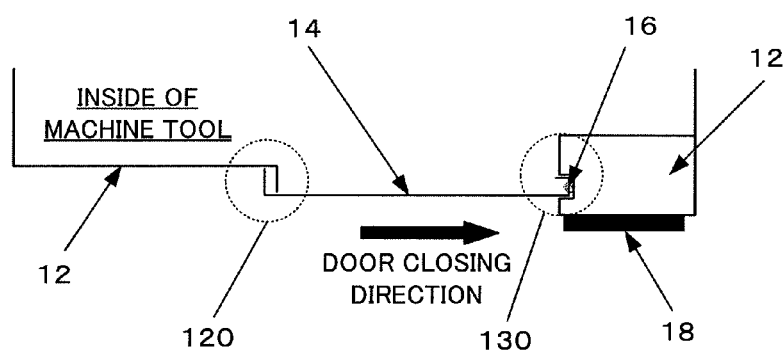
FIG. 27 is a view explaining a cross section of the cover structure of FIG. 26.

A shock absorbing member 97 shown in FIG. 21 is a shock absorber. The shock absorber, serving as the shock absorbing member 97, is attached to one of the fixed cover or the slide door via a metal fitting (not shown).

What is claimed is:

1. A cover structure of a machine tool including a fixed cover for isolating the inside portion of the machine tool from the outside, the inside portion serving as a machining space, and at least one slide door configured to open or close an opening formed in the fixed cover, wherein
the cover structure comprises a stop structure configured to, when the slide door is moved in the closing direction, stop the slide door at a predetermined distance away from a first end surface of the opening of the fixed cover, the stop structure being provided on the fixed cover at a portion other than the first end surface of the opening of the fixed cover;
the opening of the fixed cover has an end portion extending across the closing direction of the slide door, the end portion defining a second end surface of the opening, the first end surface opposite the second end surface in the closing direction;
the stop structure is provided at the end portion of the opening of the fixed cover; and
in a closed position of the slide door, the slide door engages the stop structure and is spaced, in the closing direction, at the predetermined distance away from the first end surface of the opening of the fixed cover.

2. The cover structure of the machine tool according to claim 1, wherein the stop structure includes a shock absorbing member.

3. The cover structure of the machine tool according to claim 2, wherein the shock absorbing member is attachable to and detachable from the end portion of the opening of the cover structure.

4. The cover structure of the machine tool according to claim 2, wherein the shock absorbing member is made of cushion rubber or cushion sponge, or is formed by a spring or an shock absorber, or is formed by a metal plate to which one of cushion rubber, cushion sponge, a spring, and a shock absorber is fixed.

5. The cover structure of the machine tool according to claim 1, wherein the stop structure has a portion inside the opening and located between the first and second end surfaces of the opening.

6. The cover structure of the machine tool according to claim 1, wherein
the first end surface of the opening of the fixed cover defines a recess therein, and
in the closed position of the slide door, the slide door engages the stop structure and has an end within the recess and spaced, in the closing direction, at the predetermined distance away from a bottom of the recess.

7. A cover structure of a machine tool including a fixed cover for isolating the inside portion of the machine tool from the outside, the inside portion serving as a machining space, and at least one slide door configured to open or close an opening formed in the fixed cover, wherein
the opening of the fixed cover has a first end rim, a second end rim, a top rim and a bottom rim therein;
at least one electronic device is disposed in the fixed cover adjacent to the second end rim;
the slide door is configured to be slid in a closing direction from the first end rim toward the second end rim of the opening to close the opening in the fixed cover;
the cover structure comprises a stop structure provided at at least one of the top rim or the bottom rim of the opening and configured to stop the slide door when the slide door is moved in the closing direction so as to keep the slide door at the predetermined distance away from the second end rim of the opening of the fixed cover, thereby preventing the slide door from directly contacting the fixed cover and reducing the possibility of breakage of the electronic device; and
in a closed position of the slide door, the slide door engages the stop structure and is spaced, in the closing direction, at the predetermined distance away from the second end rim of the opening of the fixed cover.

8. The cover structure of the machine tool according to claim 7, wherein the stop structure includes a shock absorbing member.

9. The cover structure of the machine tool according to claim 8, wherein the shock absorbing member is attachable to and detachable from the at least one of the top rim or the bottom rim of the opening of the cover structure.

10. The cover structure of the machine tool according to claim 8, wherein the shock absorbing member is made of cushion rubber or cushion sponge, or is formed by a spring or an shock absorber, or is formed by a metal plate to which one of cushion rubber, cushion sponge, a spring, and a shock absorber is fixed.

11. The cover structure of the machine tool according to claim 7, wherein the stop structure is arranged at a middle part of the at least one of the top rim or the bottom rim.

12. The cover structure of the machine tool according to claim 7, wherein
the second end rim of the opening of the fixed cover defines a recess therein, and
in the closed position of the slide door, the slide door engages the stop structure and has an end within the recess and spaced, in the closing direction, at the predetermined distance away from a bottom of the recess.

\* \* \* \* \*